(12) United States Patent
Malamud et al.

(10) Patent No.: US 8,561,059 B2
(45) Date of Patent: Oct. 15, 2013

(54) APPARATUS AND STORAGE DEVICE FOR CONSOLIDATING INSTALLATION AND DEPLOYMENT OF ENVIRONMENTS

(75) Inventors: Avi Malamud, Kiriat Motzkin (IL); Nitzan Levi, Rehovot (IL)

(73) Assignee: SAP AG, Walldorf (DE)

( * ) Notice: Subject to any disclaimer, the term of this patent is extended or adjusted under 35 U.S.C. 154(b) by 973 days.

(21) Appl. No.: 12/419,315

(22) Filed: Apr. 7, 2009

(65) Prior Publication Data

US 2010/0257522 A1    Oct. 7, 2010

(51) Int. Cl.
*G06F 9/445* (2006.01)

(52) U.S. Cl.
USPC ............................ 717/176; 717/175; 709/203

(58) Field of Classification Search
USPC ................. 717/107–109, 120–122, 168–178; 709/203–204
See application file for complete search history.

(56) References Cited

U.S. PATENT DOCUMENTS

| | | | |
|---|---|---|---|
| 6,601,234 B1 * | 7/2003 | Bowman-Amuah | 717/108 |
| 6,748,417 B1 * | 6/2004 | Helland | 709/203 |
| 7,120,896 B2 * | 10/2006 | Budhiraja et al. | 717/105 |
| 7,322,031 B2 * | 1/2008 | Davis et al. | 717/177 |
| 7,653,687 B2 * | 1/2010 | Reisman | 709/203 |
| 7,657,887 B2 * | 2/2010 | Kothandaraman et al. | 717/176 |
| 7,716,279 B2 * | 5/2010 | Savchenko et al. | 709/203 |
| 7,735,060 B2 * | 6/2010 | Harvey et al. | 717/107 |
| 7,810,090 B2 * | 10/2010 | Gebhart | 717/176 |
| 7,926,030 B1 * | 4/2011 | Harmon | 717/121 |
| 7,971,180 B2 * | 6/2011 | Kreamer et al. | 717/101 |
| 8,047,682 B2 * | 11/2011 | Zheng et al. | 362/249.05 |
| 8,069,437 B2 * | 11/2011 | Aigner et al. | 717/109 |
| 8,095,923 B2 * | 1/2012 | Harvey et al. | 717/171 |
| 8,122,426 B2 * | 2/2012 | Isom | 717/103 |
| 8,141,030 B2 * | 3/2012 | Finlayson et al. | 717/102 |
| 8,230,417 B1 * | 7/2012 | Clark et al. | 717/174 |
| 8,239,856 B2 * | 8/2012 | Bull et al. | 717/175 |

OTHER PUBLICATIONS

Chazalet et al, "A Model-Driven Environment for the Deployment of Pervasive Service-Oriented Applications" ACM, pp. 149-157, 2009.*
Dragone et al, "SoSAA: A Framework for Integrating Components & Agents", ACM pp. 722-728, 2009.*
Mecella et al, "Designing wrapper components for e-services in integrating heterogeneous systems" The VLDB Journal 10: pp. 2-15, 2001.*
Huang et al, "The Design of a Generic Framework for Integrating ECA Components" ACM pp. 128-135, 2008.*

* cited by examiner

*Primary Examiner* — Anil Khatri
(74) *Attorney, Agent, or Firm* — Soroker Agmon

(57) ABSTRACT

A system and storage medium for providing a full service oriented architecture environment solution for enterprises. The system and storage medium include backend systems, enabling technology modules or components, specific domain services adapted for the domain, applications relevant for the domains, development tools, exemplary business content, and optionally also demo programs. All components and applications are pre-configured to work in coordination with no further configuration requirements, or installation or additional components. The system and storage medium optionally comprise exemplary data for the environment.

12 Claims, 1 Drawing Sheet

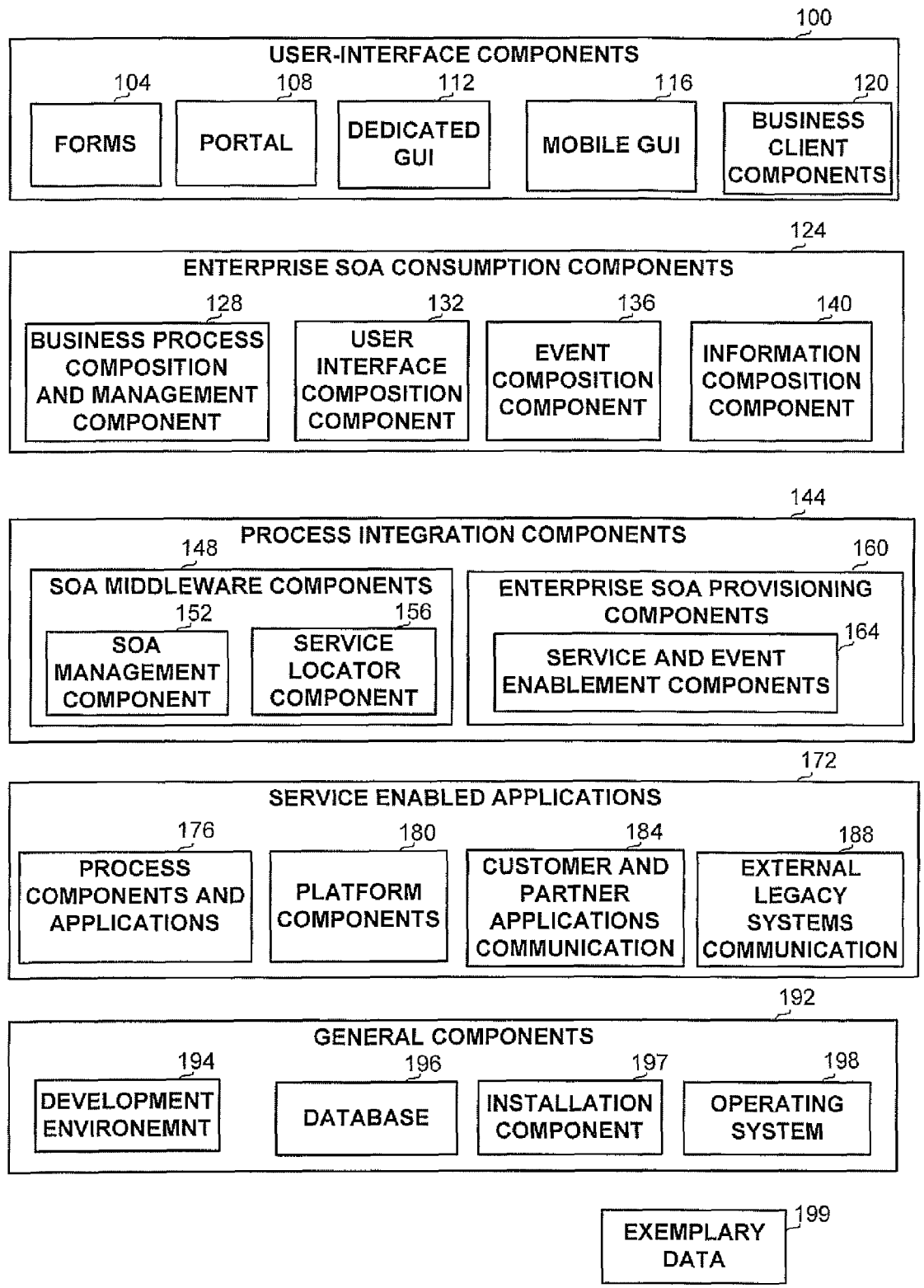

APPARATUS AND STORAGE DEVICE FOR CONSOLIDATING INSTALLATION AND DEPLOYMENT OF ENVIRONMENTS

TECHNICAL FIELD

The present invention relates to enterprise computing in general, and to an apparatus and a storage device for consolidating required installation and deployment components for a complex system, in particular.

BACKGROUND

In today's enterprise world, as the number and complexity of the components of a computerized environment increase, adding or changing systems or parts thereof are becoming a major decision for an organization.

A system typically comprises basic components such as operating systems and databases, backend systems business applications, development tools for adding applications or services, and communication components for all the above. Once a system is up and running, business content can be inserted and used.

When changing or adding a component, the enterprise has to consider many implications, including compatibility with existing or external systems, direct cost, labor time of organization employees, additional components that have to be purchased or upgraded in order to be compatible with the new ones, future extension possibilities, down-time, possible failures, and the like.

In addition, large organizations usually have to interface with multiple entities or services, such as partners, third parties, customers and others, whose systems may not always operate according to the same standards or technologies as the organization's systems.

A similar problem exists with legacy systems used within and by an organization. Sometime an organization cannot or does not want to replace such systems which perform certain tasks, and new components have to adapt and interface with the older systems, although the technologies used by the systems may be different and even incompatible.

Therefore, an organization may hesitate before committing to a new system or component and would first like to get a feeling of the new offer and how it integrates with other parts of the system. However, most demonstration systems are either merely a facade and not operative systems, or are very general and try to aim at multiple domains, and thus have only very limited operability. Alternatively, custom-made demonstration systems for complex environments require significant resources from both the vendors and the customer, and are thus expensive, and usually again have limited operability. The limited operability does not enable the organization to grasp the full meaning of using the system, the implications, requirements, challenges and opportunities.

Many of today's business systems are using or are moving towards using the Service Oriented Architecture (SOA), in which systems communicate via the provisioning and consuming of specific services. For example, in the banking world, possible services may include "open a bank account", "deposit money" or the like, while in commercial applications, the services are more likely to be "add customer", "perform a sale", or others.

There is thus a need in the art for a utility which enables for installing and deploying an end-to-end enterprise solution, in a fast and easy manner which does not require special expertise or a long period. The solution should be useful with any standard hardware, such as an off-the-shelf standalone server, and should support service oriented architecture.

The solution should enable a customer get hands-on experience with the full system, and not a limited one, and thus understand not only the technological aspects but also the business aspects and their implications on the customer.

SUMMARY

A system and storage medium for providing a full service oriented architecture environment solution for enterprises. The system and storage medium include backend systems, enabling technology modules or components, specific domain services adapted for the domain, applications relevant for the domains, development tools, exemplary business content, and optionally also demo programs. All components and applications are pre-configured to work in coordination with no further configuration requirements, or installation or additional components. The system and storage medium optionally comprise exemplary data for the environment.

In accordance with one aspect of the disclosure, there is thus provided a system for installing and deploying within an organization a domain environment employing service oriented architecture on a general purpose computer, the system comprising (a) one or more application components, providing two or more processes relevant for the organization, (b) one or more process integration components for integrating the processes, (c) one or more service consumption components for using the processes, and (d) one or more user interface components for receiving information from a user activating one or more of the processes. Within the system, each of the application components is optionally is either one of (a) a process component providing business functionality, (b) a service component providing infrastructure functionality, (c) a component for communicating with a customer or partner application, or (d) a component for communicating with a legacy system. Within the system, one of the process integration components is optionally either one of (a) a system management component, (b) a service locator component, or (c) a service and event enablement component. Within the system, one of the service consumption components is optionally either one of, (a) a business process composition component, (b) a user interface composition component, (c) an event composition component, or (d) information composition component. Within the system, one of the user interface components is optionally either one of (a) a form, (b) a portal, (c) dedicated graphic user interface (GUI), (d) mobile GUI, or (e) a business client component. The system can further comprise a development environment for adding a business process to the environment. The system can further comprise (a) an installation deployment component for deploying application components, (b) the process integration components, (c) the service consumption components, or (d) the user interface components. The system can further comprise a database and an operating system. Within the system the one or more of the application components, one or more of the process integration components, one or more of the service consumption components and one or more of the user interface components are pre-configured to communicate with one or more other components. The system can further comprise exemplary data associated with the environment. Within the system, the environment is optionally a banking environment.

A second aspect of the disclosure relates to a computer readable storage medium containing a set of instructions for installing and deploying a domain environment system employing service oriented architecture on a general purpose computer, wherein the set of instructions comprises (a) one or more application components, providing two or more processes relevant for the organization, (b) one or more process integration components for integrating the processes, (c) one or more service consumption components for using the processes, (d) one or more user interface components for receiving information from a user activating one or more of the processes, (e) a development environment for adding a business process, (f) a deployment component for deploying the business applications, the integration components and the development environments, wherein the application components, the one process integration components, the service consumption components and the user interface components are pre configured to communicate. The storage medium can further comprise exemplary data associated with the environment.

BRIEF DESCRIPTION OF THE DRAWINGS

The present invention will be understood and appreciated more fully from the following detailed description taken in conjunction with the drawing in which corresponding or like numerals or characters indicate corresponding or like components. Unless indicated otherwise, the drawing provides exemplary embodiments or aspects of the disclosure and does not limit the scope of the disclosure. In the drawing:

FIG. 1 is a block diagram of the main components of a typical deployed system in accordance with the disclosure.

DETAILED DESCRIPTION

The disclosure relates to a system and method for providing a full SOA solution for enterprises. The solution includes backend systems, enabling technology modules or components, specific domain services adapted for the domain, applications relevant for the domains, development tools, exemplary business content, and optionally also demo programs. All components and applications are pre-configured to work together with no further configuration requirements, or installation or additional components.

The disclosed system comprises consolidated installation for all the above mentioned components, being pre-configured to operate together, and to provide or consume services to or from systems external to the organization. The disclosed system thus comprises multiple collections of computer instructions, which when deployed on a general purpose computer provide a genuine replication of a complex environment. The components may be developed under any development environment, such as .NET (Microsoft Inc.) or J2EE (Oracle Corporation) and in any programming language, such as but not limited to C++; C#, JAVA (Oracle Corporation) or a combination thereof. Any of the components can also be purchased from a third party. A storage medium storing the collections of computer instructions, wherein the various components are pre-configured to operate in coordination, is also an aspect of the disclosure.

The disclosed apparatus and storage medium provide a technical solution to the technical problem of providing and installing multiple applications, interfacing with multiple legacy and third party applications, combining processes and user interface components, by a single tool. The tool does not require expertise in installing and using, and the provided functionality may be extended according to the requirements of the specific organization.

The consolidated installation may operate as one or more executables which cause one or more programs or other executables to be installed on any standard server.

The deployment can be performed using any standard tool. In some embodiments, a platform-agnostic tool such as any of the VMWare, product family, developed by VMware, Inc. of Palo Alto, Calif., USA, which is executed directly on the underlying hardware of the server, and is thus oblivious to the operating system.

In an exemplary embodiment, the installed system is a banking system. The installed components comprise: the core technology, which enables the execution of the application on a uniform environment; the business applications, such as various banking applications; integration components for providing communication capabilities among the components, and between the installed components and external systems; a development environment for adding new business processes; a database; an operating system; and the deployment component such as VMWare detailed above. The installation may further comprise exemplary content. The exemplary content includes raw content, for example customer list, business partners, virtual transactions, or the like. It will be appreciated that the raw data is preferably fictive and not based upon real people, companies, transactions, or the like. The exemplary content further comprises service oriented components, i.e., applications which provide services relevant for the organization, such as banking services. It will be appreciated that the services are operative and can be used for fictive data as well as for real-life data. The exemplary content may further comprise applications, which use the data, internal and/or external services.

Referring now to FIG. 1, showing a schematic block diagram of the components in a system for creating a business environment.

The installation comprises user interface components 100, which include components required for receiving information from a user of the system, whether the user is an organization, such as a bank employing the system, or an end user such as a client of the bank. User interface components 100 may include but are not limited to one or more forms 104, one or more portals 108, one or more dedicated GUI components 112, one or more mobile GUI components 116, one or more business client interface components 120, analytics components, or the like.

The installation further comprises service consumption components such as enterprise SOA consumption components 124, which include components for using and combining services. Enterprise SOA consumption components 124 optionally include business process composition and management component 128, user interface composition component 132, service and event composition component 136 and information composition component 140.

The installation further comprises enterprise process integration components 144, which comprise software components that handles the process integration within the environment, such as the banking environment. Process no integration components 144 may include SOA middleware components 148 which further includes SOA management component 152 and service locator component 156. Process integration components 144 further include enterprise SOA provisioning components 160 which include service and event enablement components 164.

The installation further comprises service enabled applications 172 which expose applications that provide functionalities, using standard means, such as web services business APIs, enterprise services, or the like. Service enabled applications 172 include process components and applications 176 such as bank account components, platform components 180, customer and partner applications 184, and external legacy systems 188.

User interface components 100 include electronic forms 104, which may be generated and presented using any technology. The forms are used for receiving information from a user and passing the information to the various systems. Different people may receive different forms even for the same purpose. For example, a teller opening an account may be presented with a different form than a manager opening an account, since the manager may be opening an account with higher sums, and should therefore fill more details regarding guarantees. Portal 108 includes internet pages. In some embodiments the internet pages are role-based, i.e., their appearance changes according to the user to which they are displayed. For example, a web page displayed to a department manager may look different than a web page displayed to a teller.

Dedicated GUI 112 comprises graphic user interface that is part of backend systems, such as legacy systems. In some environments, multiple constraints may exist, including external systems that have to be used and communicated with, including user interface components of such systems.

Mobile GUI 116 relates to presenting and collecting information via a mobile device, such as a mobile phone. Using a mobile device differs from using other devices in that communication between the device and the system is often asynchronous. In such cases, the system does not leave an open connection with the device until response is received, but rather each response carries an identifier that enables the system to associate and utilize the response and retrieve information therefrom.

In some embodiments, the user interface components detailed above contain and apply little or no logic. For example, in a form intended for opening an account, usually no validation is performed at the form level. In some embodiments, basic logic is applied by the form, such as hiding passwords.

Business client components 120 comprise components that do apply some logic, for example when legacy systems are used, which cannot be changed.

Enterprise SOA consumption components 124 may comprise business process composition and management component 128, which composes different business processes for performing a task. For example, the process of opening an account may activate the process of checking the guarantees associated with the account holder.

User interface composition component 132 is responsible for exposing the different processes, in accordance with the person or person type handling the process. Thus, different persons performing the same task may be presented with different user interface, due for example to their different privileges.

Event composition component 136 is responsible for integrating an event in the business process. In some embodiments, an event relates to an occurrence which is not willfully initiated but is rather pushed by the system. For example, in the case of an event being a sum of money deposited in an account, the system may automatically initiate a process of immediately notifying the account holder and suggesting him to open a saving account, while a sum withdrawn from an account will only cause notification some time later, so that the bank can collect some interest in the meantime.

Information composition component 140 collects, provides and optionally manipulates further information regarding the processes, such as decision support information. For example, if a sum of money is deposited in an account, and the customer is offered to open a saving account, the information collected by component 140 may refer to various available saving channels.

Process integration components 144 are responsible for combining processes within the organization. For example, if during opening an account, credit scoring has to be performed, then process integration components 144 activate credit scoring and make sure a positive answer is received before continuing with opening the account. SOA middleware components 148 are responsible for the technological aspects of integrating the services. SOA middleware components 148 include SOA management component 152, responsible for managing the infrastructure associated with the various systems, such as the servers in the system, their Internet Protocol (IP) addresses, and the like, and service locator component 156 which provides the service mapping, such as which services are provided by which server, at which IP address and port, and the like.

Process integration components 144 also include enterprise SOA provisioning components 160 which expose or externalize the services. For example, if a certain person or role-holder is allowed to perform a certain task, such as approving a loan, while another person or role holder is not, components 160 are responsible for this task to be enabled only to the persons who have approval.

Service and event enablement components 164 are responsible for routing, exposing or blocking services or events according to the user or user type, and their privileges. Services are acts initiated by the user or by the system, such as making an offer to a customer. Events are occurrences pushed into the system, such as a notification issued by one bank to other banks, relating to a restricted customer. Such services or events may be notified to some users or to users of some type such as department manager, and not to other users or user types.

In the exemplary banking environment, service and event enablement components 164 optionally comprise objects related to sales and service, campaign and opportunity management, operation and execution, collaterals, payments, leasing execution, banking analytics, analysis and management financial instrumentation, business support, or the like.

Within service enabled applications 172, process components and applications 176 include software components that include the business layer, i.e. provide the business functionality. Service enabled applications 172 also include platform components 180 which provide infrastructure components, related for example to passwords, logins, account management, encryption, backups, interfaces between systems, or the like.

Customer and partner components 184 include components which communicate with existing external systems, such as partner or customer applications and enable the consumption of external services, such as credit card clearing, credit rating, or the like.

External legacy communication components 188 enable the interface with legacy systems existing within the environment. Such systems may use older technology and may be hard to adapt or upgrade. External legacy communication components 188 provide the interfaces and enable the organization to continue using the systems.

The system may further comprise general components 192 such as development environment 194 for adding new applications or business processes; database 196, operating system 197, and an installing component 198 such as VMWare detailed above. The system may further comprise fictive or real exemplary data 199, relevant for the environment.

The disclosed system thus provides for easy deployment and usage of an end-to-end solution for complex systems which is fast and does not require special expertise. For example, a banking environment can be deployed in as little as a few hours by an ordinary technician, as compared to several man months of experts in different fields which have to cooperate, required for regular establishment of a partial environment.

The installed environment also comprises exemplary but realistic data, such as customer accounts for virtual customers, and the ability to add, change or delete data, and to add functionality, such as provisioning or consuming of new services.

The customer can thus get hands-on experience and overall understanding of the systems, possible scenarios, its merits and problems. The customer can further test the architecture, try the concepts and functionality, test additional and external systems interfacing with the deployed system, and acquire better understanding for the challenges such system poses. The customer can also better estimate the resources that should be allotted to implementing the full scale system prior to taking the commitment.

The disclosed system comprises replicable data and software designed to be executed and used by any standard platform, so no special hardware and equipment is required for the installation, and the customers can test the system on any standard equipment available for them. The system is replicable, i.e. can be deployed and used anywhere without clash problems, since each deployment is standalone. The whole system can be executed on a single server, and therefore also requires little maintenance.

The solution is domain-oriented, and is thus adapted for a particular domain, such as banking, retail, manufacturing or the like. The solution thus uses the domain-specific terms rather than general terms, which also enables the user to immediately start trying the system, without specific adaptations. The solution enables standard interfacing with pre-existing external systems, such as credit card companies interfacing with banking environments.

The user can prototype or develop specific features, applications or programs if desired, since the deployed system is a full comprehensive system, and not a limited facade demo. The solution provides snapshot to the full system, which is of larger scale and comprises the full data of the organization, before actually buying and committing to such system. The customer receives comprehensive awareness to the requirements and resources that using such full system will impose, without having to pay, directly or indirectly for a pricey and partial demo.

It will be appreciated that the disclosure also relates to a storage medium comprising one or more sets of computer instructions and data implementing the components detailed in association with FIG. 1 above.

It will be appreciated that the disclosure is exemplary only and that multiple other implementations which utilize other divisions to components may be devised.

It will also be appreciated that the disclosure is not related only to banking and that the system can be utilized for offering a hands-on experience to various environments which require, use and provide a variety of services.

It will be appreciated by persons skilled in the art that the present invention is not limited to what has been particularly shown and described hereinabove. Rather the scope of the present invention is defined only by the claims which follow.

What is claimed is:

1. A system for installing and deploying within an organization a domain environment employing service oriented architecture on a general purpose computer, the system comprising:
   an application component, providing at least two processes relevant for the organization;
   a process integration component for integrating the at least two processes;
   a service consumption component for using the at least two processes; and
   a user interface component for receiving information from a user activating at least one of the at least two processes, thereby providing a service-oriented-architecture (SOA) for the organization,
   wherein the application component, the process integration component, the service consumption component and the user interface component are entirely pre-configured and ready to operate together as an executable program on a general purpose computer; and
   further comprising an installation deployment component for deploying the application component, the process integration component; the service consumption component; or the user interface component.

2. The system of claim 1 wherein the application component is selected from the group consisting of: a process component providing business functionality;
   a service component providing infrastructure functionality;
   a component for communicating with a customer or partner application; and
   a component for communicating with a legacy system.

3. The system of claim 1 wherein the process integration component is selected from the group consisting of:
   a system management component;
   a service locator component; and
   a service and event enablement component.

4. The system of claim 1 wherein the service consumption component is selected from the group consisting of:
   a business process composition component;
   a user interface composition component; an event composition component; and information composition component.

5. The system of claim 1 wherein the user interface component is selected from the group consisting of:
   a form;
   a portal;
   dedicated graphic user interface (GUI);
   mobile GUI; and
   a business client component.

6. The system of claim 1 further comprising a development environment for adding a business process to the environment.

7. The system of claim 1 further comprising a database and an operating system.

8. The system of claim 1 wherein the application component, the process integration component, the service consumption component and the user interface component are pre-configured to communicate with at least one other component.

9. The system of claim 1 further comprising exemplary data associated with the environment.

10. The system of claim 1 wherein the environment is a banking environment.

11. A non-transitory computer readable storage medium containing a set of instructions for installing and deploying a domain environment system employing service oriented architecture on a general purpose computer, wherein the set of instructions comprises:
   an application component, providing at least two processes relevant for an organization;
   a process integration component for integrating the at least two processes;

a service consumption component for using the at least two processes;

a user interface component for receiving information from a user activating at least one of the at least two processes; thereby providing a service-oriented-architecture (SOA) for the organization;

wherein the application component, the process integration component, the service consumption component and the user interface component are entirely pre-configured and ready to operate together as an executable program on a general purpose computer; and further comprising an installation deployment component for deploying the application component, the process integration component; the service consumption component; or the user interface component.

12. The computer readable storage medium of claim 11 further comprising exemplary data associated with the environment.

\* \* \* \* \*